United States Patent Office 2,891,958
Patented June 23, 1959

2,891,958

CERTAIN ALKYL N-PYRIDYLTHIOPICOLINAMIDES AND ALKYL N-PYRIDYLTHIOSONICOTINAMIDES AND PROCESS

Francis E. Cislak, Indianapolis, Ind., assignor to Reilly Tar & Chemical Corporation, Indianapolis, Ind., a corporation of Indiana No Drawing. Application May 29, 1958
Serial No. 738,595

6 Claims. (Cl. 260—294.8)

This invention relates to a new composition of matter and to the process of making it. More particularly, it relates to N-pyridylthiopicolinamides and to N-pyridylthioisonicotinamides, which compounds have the following structural formulae:

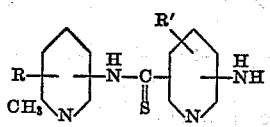

or

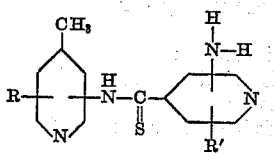

where R and R' are hydrogen or lower alkyl.

In general, the thioamides of my invention are prepared by heating, above 100° C., sulfur with an amino-2-picoline or an amino-4-picoline. The equation below depicts the formation of N-2'-(6'-methylpyridyl)-6-aminothiopicolinamide by the reaction of sulfur and 2-amino-6-methylpyridine.

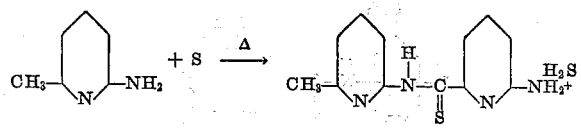

Illustrative of the manner in which my invention may be practiced are the following specific examples:

EXAMPLE 1

*N-2'-(6'-methylpyridyl)-6-aminothiopicolinamide*

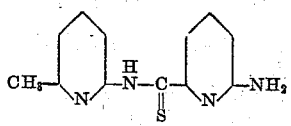

Two hundred grams of 2-amino-6-methylpyridine and 100 grams of sulfur were mixed and placed in a flask. I may use a diluent, such for example, as 3-picoline, if I desire although in general I prefer not to use any diluent. The mixture is heated to about 140° C. and while being stirred continuously is maintained at a temperature of from about 130° C. to about 150° C. for approximately six hours. Hydrogen sulfiide is evolved during the heating period. The N-2'-(6'-methylpyridyl)-6-aminothiopicolinamide formed during the heating period may be separated from the unreacted sulfur and 2-amino-6-methylpyridine in any convenient manner.

A suitable manner of isolating the N-2'-(6'-methylpyridyl)-6-aminothiopicolinamide is as follows: After the reaction period is completed, the mixture is subjected to distillation under vacuum in order to remove the unreacted 2-amino-6-methylpyridine. As good a vacuum as can be obtained is used, preferably of the order of 0.1 mm. Hg. After all of the 2-amino-6-methylpyridine has been distilled off, the residue in the flask is cooled and then dissolved in dilute aqueous hydrochloric acid. The thiopicolinamide dissolves in the acid and the unreacted sulfur does not. The sulfur is separated from the solution by filtration. The N-2'-(6'-methylpyridyl)-6-aminothiopicolinamide is precipitated from the filtrate by neutralizing with dilute caustic soda. Upon filtering and drying, the N-2'-(6'-methylpyridyl)-6-aminothiopicolinamide is recovered as a yellow colored high melting solid. For most purposes it is sufficiently pure as obtained above. However, if a purer material is desired, the semi-pure compound may be recrystallized from pyridine-ethanol.

EXAMPLE 2

*N-2'-(3'-ethyl-6'-methylpyridyl)-5-ethyl-6-aminothiopicolinamide*

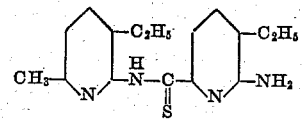

The procedure of Example 1 above is repeated with the exception that 300 grams of 2-amino-3-ethyl-6-methylpyridine are used in place of the 200 grams of 2-amino-6-methylpyridine and the heating period is increased to about 12–16 hours and N-2'-(3'-ethyl-6'-methylpyridyl)-5-ethyl-6-amino-thiopicolinamide is recovered.

EXAMPLE 3

*N-4'-(2'-methylpyridyl)-4-aminothiopicolinamide*

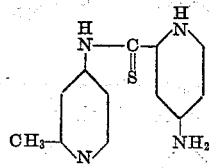

The procedure of Example 1 is repeated with the exception that 200 grams of 4-amino-2-methylpyridine are used instead of the 200 grams of 2-amino-6-methylpyridine and N-4'-(2'-methylpyridyl)-4-aminothiopicolinamide is recovered.

EXAMPLE 4

*N-3'-(6'-methylpyridyl)-5-aminothiopicolinamide*

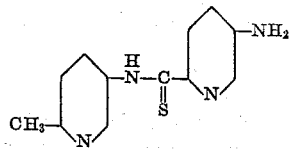

The procedure of Example 1 is repeated with the exception that 200 grams of 5-amino-2-methylpyridine are used in place of the 200 grams of 2-amino-6-methylpyridine and N-3'-(6'-methylpyridyl)-5-aminothiopicolinamide is recovered.

EXAMPLE 5

*N-2'-(4',6'-dimethylpyridyl)-4-methyl-6-aminothiopicolinamide*

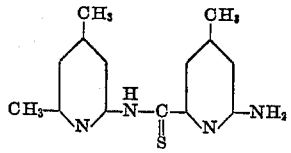

The procedure of Example 1 is repeated with the exception that 225 grams of 2-amino-4,6-dimethylpyridine are used in place of the 200 grams of 2-amino-6-methylpyridine and N-2'-(4',6'-dimethylpyridyl) - 4 - methyl-6-aminothiopicolinamide is recovered.

EXAMPLE 6

*N-2'-(4'-methylpyridyl)-2-aminothioisonicotinamide*

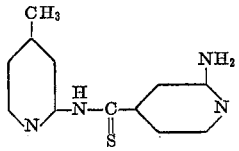

The procedure of Example 1 is repeated with the exception that 200 grams of 2-amino-4-methylpyridine are used instead of the 200 grams of 2-amino-6-methylpyridine and the heating period is increased to about 48 hours. N-2'-(4'-methylpyridyl) - 2 - aminothioisonicotinamide is recovered.

In general, I prefer to react an individual amino picoline with sulfur. However, if I so desire, I may react a mixture of aminopicolines with sulfur.

My thioamides are useful in controlling the action of non-oxidizing inorganic acids upon metals. A solution of my thioamides in high boiling coal-tar bases is particularly useful in inhibiting the action of dilute aqueous sulfuric acid upon steel.

The behavior of my thioamides indicates that they exist in two tautomeric forms. Thus, the N-2'-(6'-methylpyridyl)-6-aminothiopicolinamide, in its reactions, functions as either of the tautomeric forms shown below:

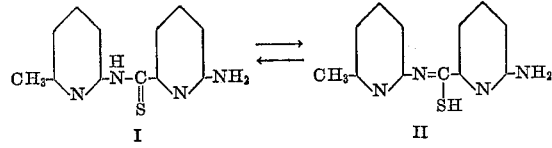

The thiol form II reacts with copper ions to form the complex compound portrayed below

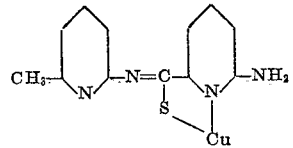

or the complex

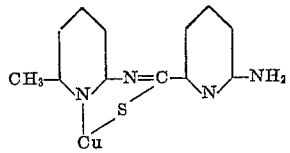

The thioamides of my invention may be reacted with sulfur in the same manner as were the amino-picolines to give compounds having a plurality of thio groups in the molecule. For example, N-2'-(6'-methylpyridyl)-6-aminothiopicolinamide may be heated with sulfur to give the compound having the formula,

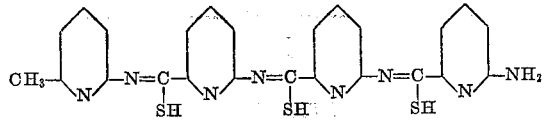

My thioamides may also be reacted with sulfur and an aromatic amine. Thus, the reaction of N-2'-(6'-methylpyridyl) - 6 - aminothiopicolinamide when heated with sulfur and aniline gives a thiopicolinanilide of the formula:

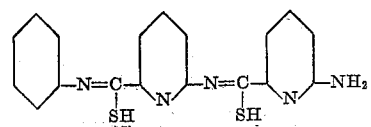

Heating my thioamides with sulfur and 2-picoline or 4-picoline also gives a compound having a plurality of thiol groups in the molecule. N-2'-(6'-methylpyridyl)-6-aminothiopicoline amide upon heating with sulfur and 2-picoline gives the compound:

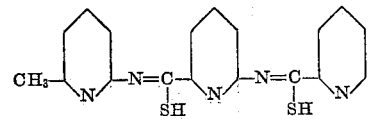

The presence of a plurality of thiol groups in the molecular structure of the above compounds makes them suitable for polymerization by metal atom-donor co-ordination.

I claim as my invention:

1. Compounds of the class consisting of N-pyridylthiopicolinamides and N - pyridylthioisonicotinamides which compounds have the structural formula:

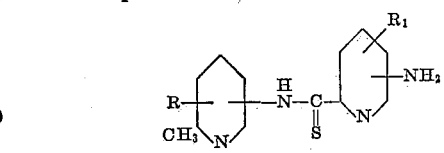

and

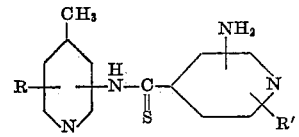

where R and R' are a member of the group consisting of hydrogen and lower alkyl.

2. The compound N-2'-(6'-methylpyridyl)-6-aminothiopicolinamide.
3. The compound N-4'-(2'-methylpyridyl) - 4 - aminothiopicolinamide.
4. The compound N-2'-(4'-methylpyridyl) - 2 - aminothioisonicotinamide.
5. The process which comprises heating, above about 100° C., a mixture comprising sulfur and a compound of the class consisting of an amino-2-picoline and an amino-4-picoline.
6. The process which comprises heating, at about 140° C., a mixture comprising sulfur and 2-amino-6-methylpyridine.

No references cited.